(12) United States Patent
Sung

(10) Patent No.: US 11,629,416 B2
(45) Date of Patent: Apr. 18, 2023

(54) FLUID ELECTROLYSIS APPARATUS

(71) Applicant: Won Kee Sung, Yongin-si (KR)

(72) Inventor: Won Kee Sung, Yongin-si (KR)

(*) Notice: Subject to any disclaimer, the term of this patent is extended or adjusted under 35 U.S.C. 154(b) by 378 days.

(21) Appl. No.: 16/635,691

(22) PCT Filed: Aug. 3, 2018

(86) PCT No.: PCT/KR2018/008818
§ 371 (c)(1),
(2) Date: Jan. 31, 2020

(87) PCT Pub. No.: WO2019/027279
PCT Pub. Date: Feb. 7, 2019

(65) Prior Publication Data
US 2021/0123149 A1    Apr. 29, 2021

(30) Foreign Application Priority Data

Aug. 4, 2017  (KR) .................. 10-2017-0099052

(51) Int. Cl.
| | |
|---|---|
| *C25B 9/65* | (2021.01) |
| *C25B 9/17* | (2021.01) |
| *C25B 11/02* | (2021.01) |
| *C25B 15/08* | (2006.01) |

(52) U.S. Cl.
CPC .............. *C25B 9/65* (2021.01); *C25B 9/17* (2021.01); *C25B 11/02* (2013.01); *C25B 15/08* (2013.01)

(58) Field of Classification Search
CPC ......... C02F 1/46104; C25B 9/65; C25B 9/13; C25B 9/17; C25B 9/73
See application file for complete search history.

(56) References Cited

U.S. PATENT DOCUMENTS

| | | | | |
|---|---|---|---|---|
| 5,043,050 | A | * | 8/1991 | Herbst ................ C02F 1/46104 |
| | | | | 204/278.5 |
| 6,846,393 | B2 | | 1/2005 | King |
| 2012/0103797 | A1 | * | 5/2012 | Hermann ................ C02F 1/463 |
| | | | | 204/278.5 |

(Continued)

FOREIGN PATENT DOCUMENTS

| | | |
|---|---|---|
| KR | 10-2006-0018040 A | 2/2006 |
| KR | 10-2009-0116396 | * 11/2009 |

(Continued)

*Primary Examiner* — Ciel P Contreras
(74) *Attorney, Agent, or Firm* — Novick, Kim & Lee PLLC; Jae Youn Kim

(57) ABSTRACT

A fluid electrolysis apparatus includes: a body part which includes an inlet port and an outlet port formed thereon and is provided with an inner space through which a fluid introduced through the inlet port passes to be discharged through the outlet port; an electrode part mounted in the inner space and including a first electrode plate and a second electrode plate, to which external powers of opposite polarity are applied, respectively, wherein the first electrode plate and the second electrode plate are alternately arranged while being spaced apart from each other, to form a plurality of fluid channels between the first electrode plate and the second electrode plate; and a conductive connection terminal part integrally formed with the body part so that at least a portion of a body thereof is embedded in the body part to apply external power to the electrode.

7 Claims, 9 Drawing Sheets

(56) References Cited

U.S. PATENT DOCUMENTS

2019/0055144 A1* 2/2019 Inagaki ................ C02F 1/4672

FOREIGN PATENT DOCUMENTS

| KR | 10-2009-0116396 A | | 11/2009 |
|---|---|---|---|
| KR | 10-2012-0041575 A | | 5/2012 |
| KR | 1268040 B1 | | 6/2013 |
| KR | 10-2014-0016222 A | | 2/2014 |
| KR | 10-1379686 | * | 3/2014 |
| KR | 1737238 B1 | | 5/2017 |

* cited by examiner

FLUID ELECTROLYSIS APPARATUS

TECHNICAL FIELD

The present invention relates to a fluid electrolysis apparatus configured to electrolyze a fluid while allowing the fluid to pass through a body in which an electrolysis electrode is accommodated, and more particularly, to a fluid electrolysis apparatus capable of entirely and uniformly electrolyzing a fluid inside the apparatus by alternately arranging electrode plates of a first electrode and a second electrode constituting an electrolysis electrode in a body to be spaced apart from each other at uniform intervals to form a plurality of channels through which the fluid passes, and also, capable of significantly improving electrolysis efficiency of a fluid and at the same time reducing the overall size of the apparatus by interposing a gasket for preventing thermal deformation of the body between an outermost electrode plate and an inner surface of the body and electrically connecting the first and second electrodes to external power sources through conductive connection terminals formed integrally with the body, respectively, to prevent the fluid passing through the channel from leaking.

BACKGROUND ART

In general, electrolysis refers to an oxidation-reduction reaction of an electrolyte fluid caused by using electrical energy, and such electrolysis is also used in the production of slightly acidic hypochlorous acid water that has recently been spotlighted as an environmentally friendly disinfectant.

That is, the slightly acidic hypochlorous acid water is produced by electrolyzing diluted hydrochloric acid (2% to 6%) using an electrolysis apparatus called a non-diaphragm electrolytic cell to generate chlorine gas and then diluting the chlorine gas with water.

Here, the used non-diaphragm electrolytic cell mainly includes a reactor body forming an electrolytic space and two electrodes (a positive electrode and a negative electrode) installed inside the electrolytic space, an inlet port through which hydrochloric acid is induced is formed at a lower portion of the body, and an outlet port through which a material generated by the electrolysis of the hydrochloric acid is discharged is formed at an upper portion of the body.

The material (i.e., chlorine gas, hydrogen gas, hydrochloric acid gas, or the like) discharged from the non-diaphragm electrolytic cell configured as described above is diluted in water supplied during a post-treatment process, and here, the chlorine gas is dissolved in water to produce slightly acidic hypochlorous acid water. The detailed configuration of such an electrolysis apparatus (that is, a non-diaphragm electrolytic cell) is disclosed in detail in Document 1 and Document 2 below.

However, since the electrolysis apparatus according to the related art disclosed in Document 1 and Document 2 mostly has a configuration in which a pair of electrodes for electrolysis are arranged to face each other, and when a separation distance between the electrodes increases according to the size or capacity of an electrolytic cell, electrolysis may not be uniformly performed throughout an inside of the electrolytic cell and thus the electrolysis efficiency of a fluid may be greatly degraded.

Further, in the case of the electrolysis apparatus according to the related art configured as described above, when a required electrolysis capacity is great, the size of an electrolysis electrode needs to be increased accordingly, and thus there was a problem that the overall size and manufacturing costs of the electrolysis apparatus increase.

[Document 1] Korean Patent Registration No. 1268040 (published on Jun. 3, 2013)

[Document 2] Korean Patent Registration No. 1737238 (published on May 17, 2017)

DISCLOSURE

Technical Problem

The present invention is directed to providing a fluid electrolysis apparatus capable of improving electrolysis efficiency of a fluid and at the same time reducing the overall size and manufacturing costs of the apparatus by alternately arranging electrode plates of a first electrode and a second electrode constituting an electrolysis electrode in a body of the electrolysis apparatus to be spaced apart from each other at uniform intervals to form a plurality of channels through which a fluid passes to have the same shape so that the fluid is entirely and uniformly electrolyzed.

The present invention is also directed to providing a fluid electrolysis apparatus capable of further improving electrolysis efficiency of a fluid by interposing a heat-resistant gasket between an outermost electrode plate and an inner surface of a body to prevent a fluid from passing through a path other than a channel and also to prevent the fluid passing through an inside of the body from leaking due to thermal deformation of the body by reaction heat of the electrode plate.

The present invention is also directed to providing a fluid electrolysis apparatus capable of further improving electrolysis efficiency of a fluid by configuring a first electrode and a second electrode to be electrically connected to external power sources through conductive connection terminals formed integrally with a body to prevent a fluid passing through an inside of the body from leaking through a power connection part.

Technical Solution

One aspect of the present invention provides a fluid electrolysis apparatus including a body part having an inlet port and an outlet port formed therein and provided with an inner space through which a fluid introduced through the inlet port passes to be discharged through the outlet port, an electrode part mounted in the inner space and including a first electrode plate and a second electrode plate to which external power sources of opposite polarities are applied, respectively, wherein the first electrode plate and the second electrode plate are alternately arranged to be spaced apart from each other to form a plurality of channels in which the fluid is electrolyzed while passing therethrough between the first electrode plate and the second electrode plate, and a conductive connection terminal embedded in and integrally molded with the body part to apply the external power source to the electrode part, wherein one end portion of the conductive connection terminal is exposed toward an inside of the body part so as to be connected to the electrode part, and the other end portion of the conductive connection terminal is exposed toward an outside of the body part so as to be connected to the external power source.

The electrode part may include a first electrode including a plurality of first electrode plates arranged to be spaced apart from each other such that plate surfaces face each other and a first lead connected to the first electrode plate, and a second electrode including at least one second electrode plate having a plate surface facing the plate surface of the first electrode plate and alternately arranged with the first electrode plates to be spaced apart from each other, and a second lead connected to the second electrode plate, and the conductive connection terminal may include a first connection terminal having one end portion exposed toward the inside of the body part and to which the first lead is electrically connected, and a second connection terminal having one end portion exposed toward the inside of the body part and to which the second lead is electrically connected.

A first lead fixing part and a first power source fixing part may be formed at one end portion and the other end portion of the first connection terminal, respectively, a second lead fixing part and a second power source fixing part may be formed at one end portion and the other end portion of the second connection terminal, respectively, and in the electrode part, the first lead and the second lead may be coupled to the first lead fixing part and the second lead fixing part, respectively, through lead fixing members in the inner space, and a pair of terminals of the external power sources having opposite polarities may be coupled to the first power source fixing part and the second power source fixing part, respectively, through power source fixing members at an outer side of the body part so that the external power sources are applied to the first electrode and the second electrode.

The electrode part may further include a first support member coupled to one end portion of the first electrode plate in a longitudinal direction of the first electrode plate at one side edge of the channel to maintain a separation distance between the first electrode plate and the second electrode plate that are alternately arranged and a second support member coupled to one end portion of the second electrode plate in a longitudinal direction of the second electrode plate at the other side edge of the channel to maintain a separation distance between the first electrode plate and the second electrode plate that are alternately arranged, and the first electrode and the second electrode may be supported on inner surfaces of the body part facing both side edges of the channel by the first support member and the second support member, respectively, in the inner space.

The other end portion of the first electrode plate, which is not coupled to the first support member, may be coupled to the second support member, and the other end portion of the second electrode plate, which is not coupled to the second support member, may be coupled to the first support member so that the plurality of channels are formed independently of each other.

When the first electrode and the second electrode are supported on the inner surfaces of the body part by the first support member and the second support member, respectively, in the electrode part, a coupling portion of the first electrode plate and the first support member and a coupling portion of the second electrode plate and the second support member may be in close contact with the inner surfaces of the body part, respectively, on which the first electrode and the second electrode are supported.

A supply channel guide configured to guide the fluid introduced through the inlet port to an inlet of the channel at a uniform flow velocity may be further formed between the inlet of the channel and the inlet port in the inner space, and the supply channel guide may be formed in a shape that is closer to the inlet of the channel as the inlet of the channel is farther from the inlet port.

The fluid electrolysis apparatus according to the present invention may further include a gasket interposed to be in close contact between the inner surface of the body part facing the electrode plate of the electrode part and an outermost electrode plate of the electrode part in the inner space to prevent the fluid from passing between the inner surface of the body part facing the electrode plate of the electrode part and the electrode plate.

Advantageous Effects

A fluid electrolysis apparatus according to the present invention can improve electrolysis efficiency of a fluid and also reduce the overall size and manufacturing costs of the apparatus by alternately arranging electrode plates of a first electrode and a second electrode constituting an electrolysis electrode in a body to be spaced apart from each other at uniform intervals to form a plurality of channels through which a fluid passes to have the same shape so that the fluid is entirely and uniformly electrolyzed.

Further, a fluid electrolysis apparatus according to the present invention can further improve electrolysis efficiency of a fluid by interposing a heat-resistant gasket between an outermost electrode plate and an inner surface of a body to prevent a fluid from flowing in a path other than a channel and also to prevent the fluid flowing inside the body from leaking due to thermal deformation of the body by reaction heat of the electrode plate.

Further, a fluid electrolysis apparatus according to the present invention can further improve electrolysis efficiency of a fluid by configuring a first electrode and a second electrode to be electrically connected to external power sources through conductive connection terminals formed integrally with a body to prevent a fluid flowing inside the body from leaking through a power connection part.

MODES OF THE INVENTION

Hereinafter, an exemplary embodiment of the present invention will be described in detail with reference to the accompanying drawings.

Figure 1:
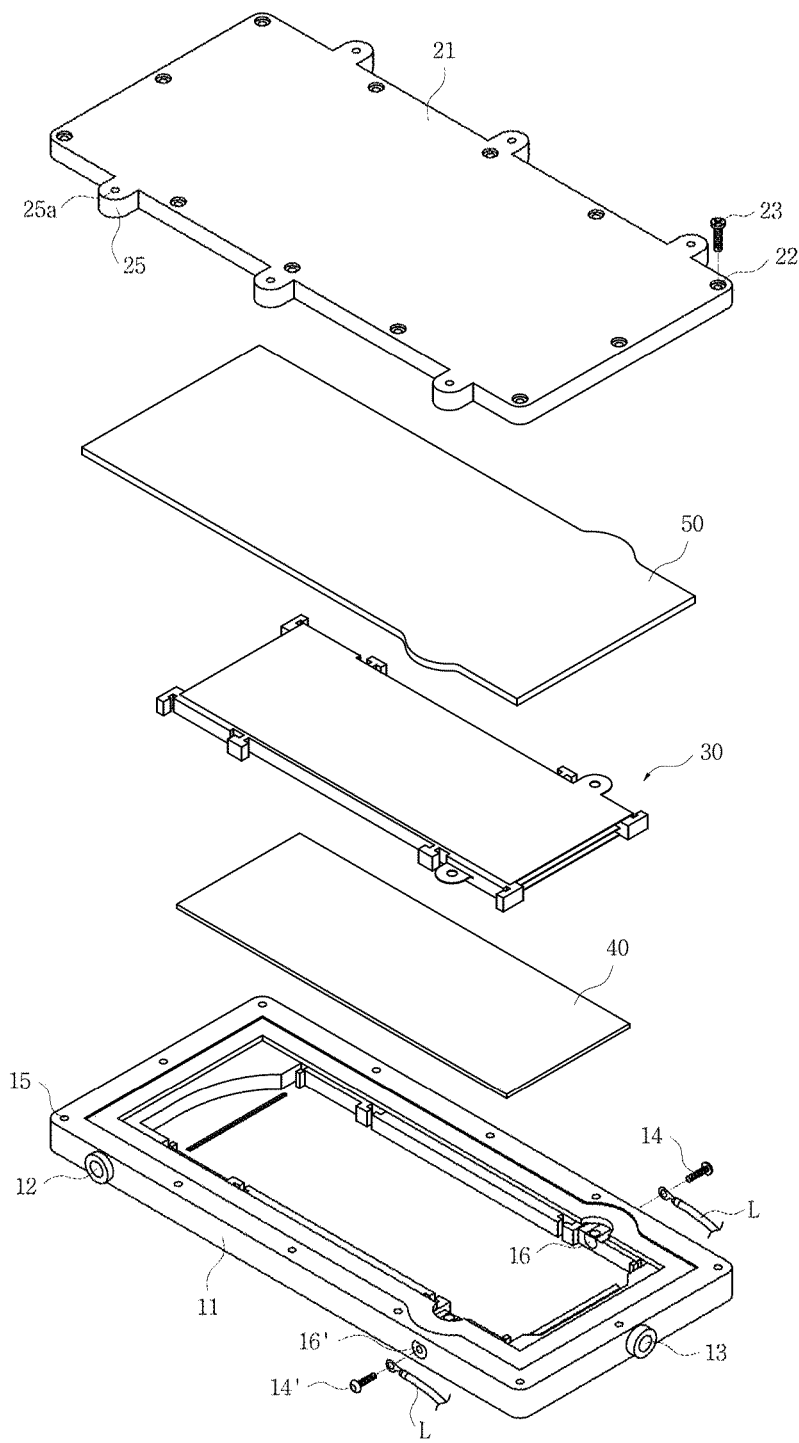
FIG. 1 is an exploded perspective view for describing the overall configuration of a fluid electrolysis apparatus according to one embodiment of the present invention.
Figure 2:
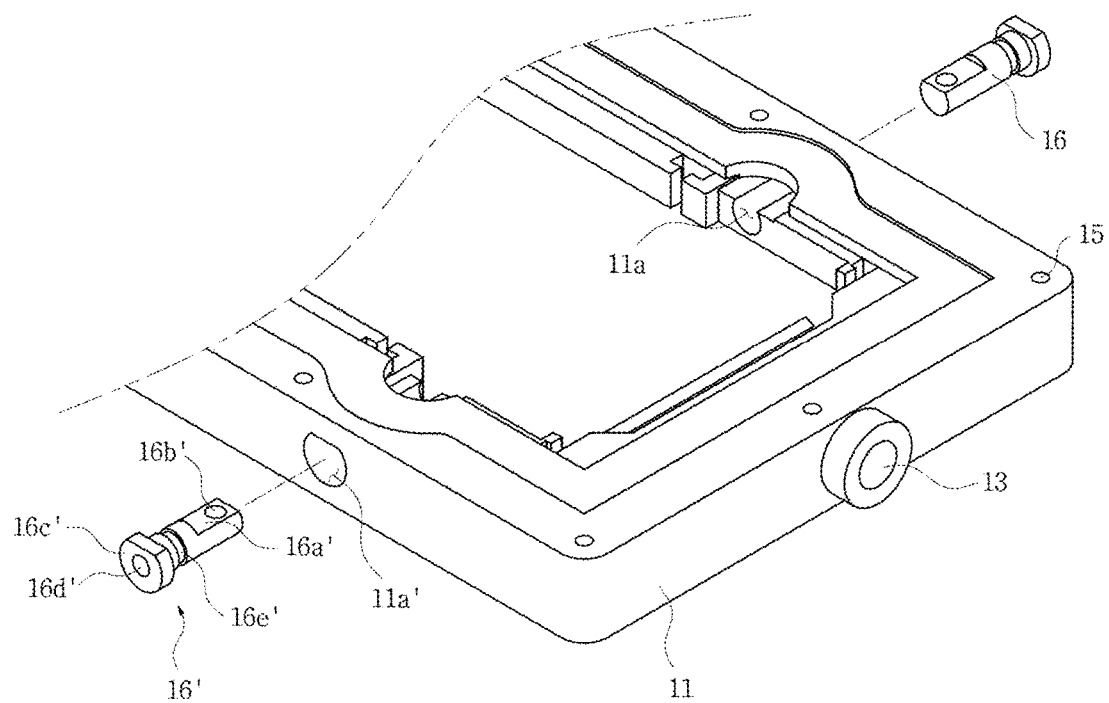
FIGS. 2 and 3 are views for describing the configuration of a body part of the fluid electrolysis apparatus illustrated in FIG. 1.
Figure 3:
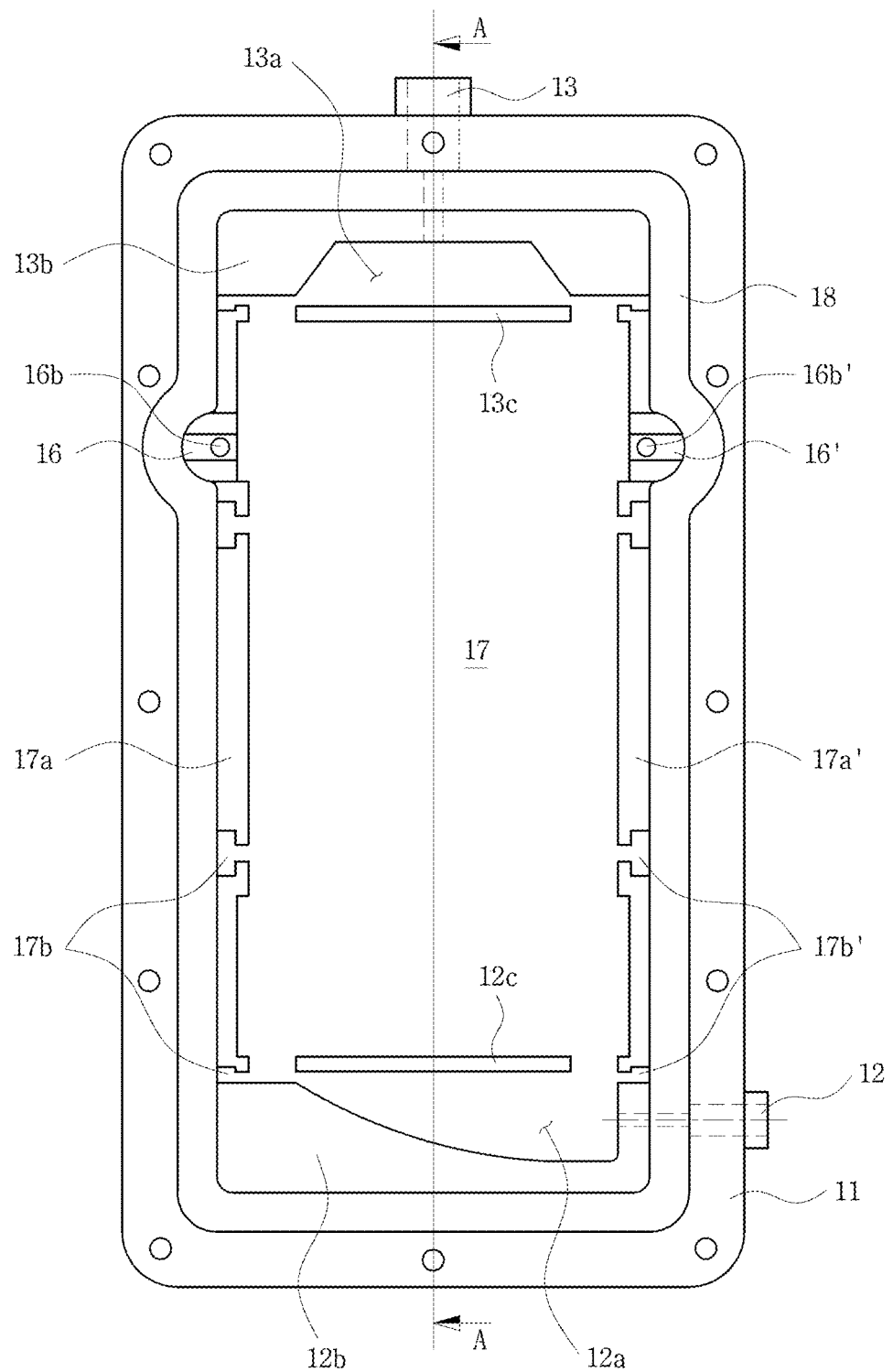
Figure 4:
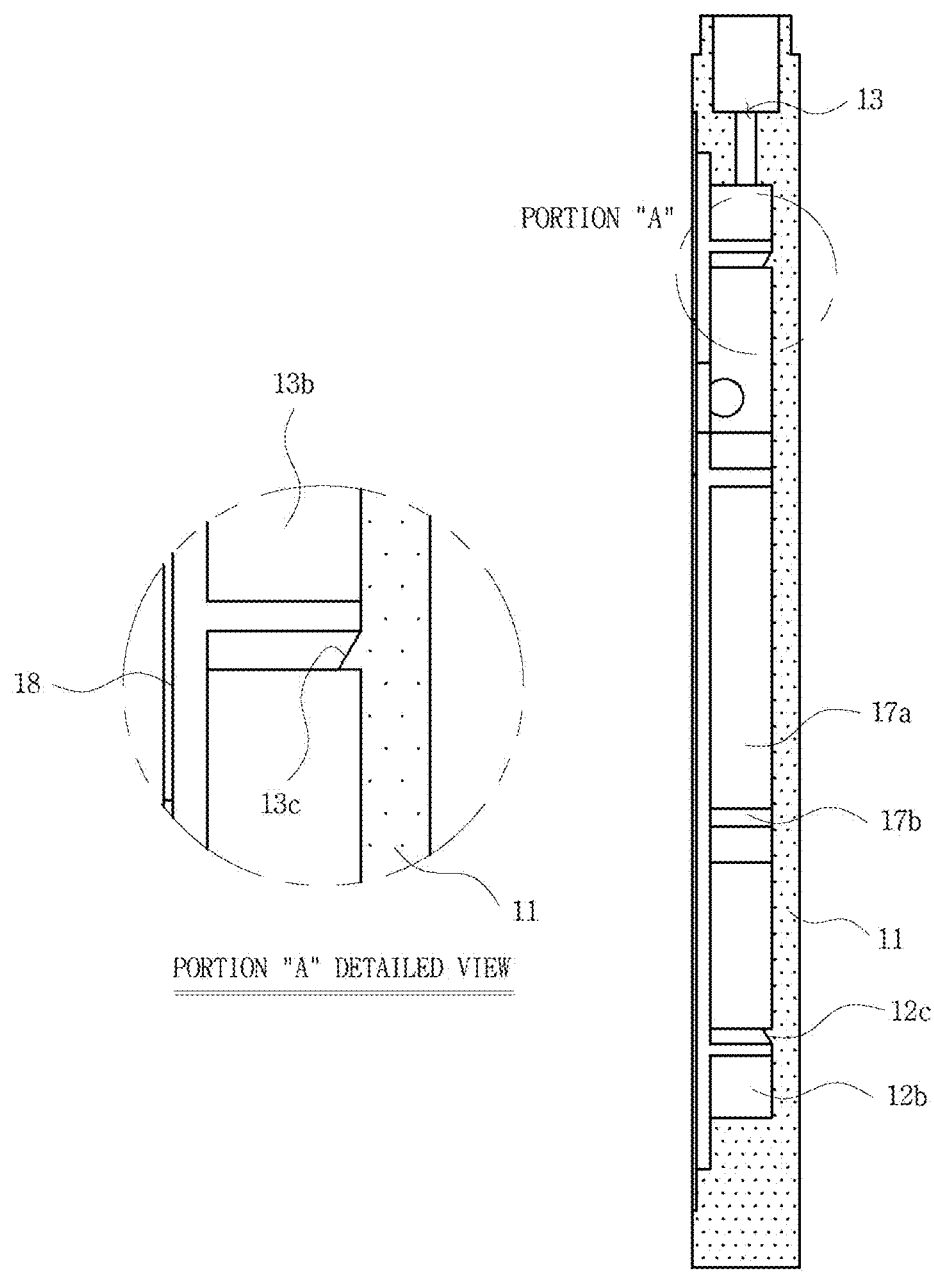
FIG. 4 is a cross-sectional view taken along line A-A of FIG. 3.

First, FIG. 1 is an exploded perspective view for describing the overall configuration of a fluid electrolysis apparatus according to one embodiment of the present invention. FIGS. 2 and 3 are views for describing the configuration of a body part of the fluid electrolysis apparatus illustrated in FIG. 1, and FIG. 4 is a cross-sectional view taken along line A-A of FIG. 3.

Figure 5A:
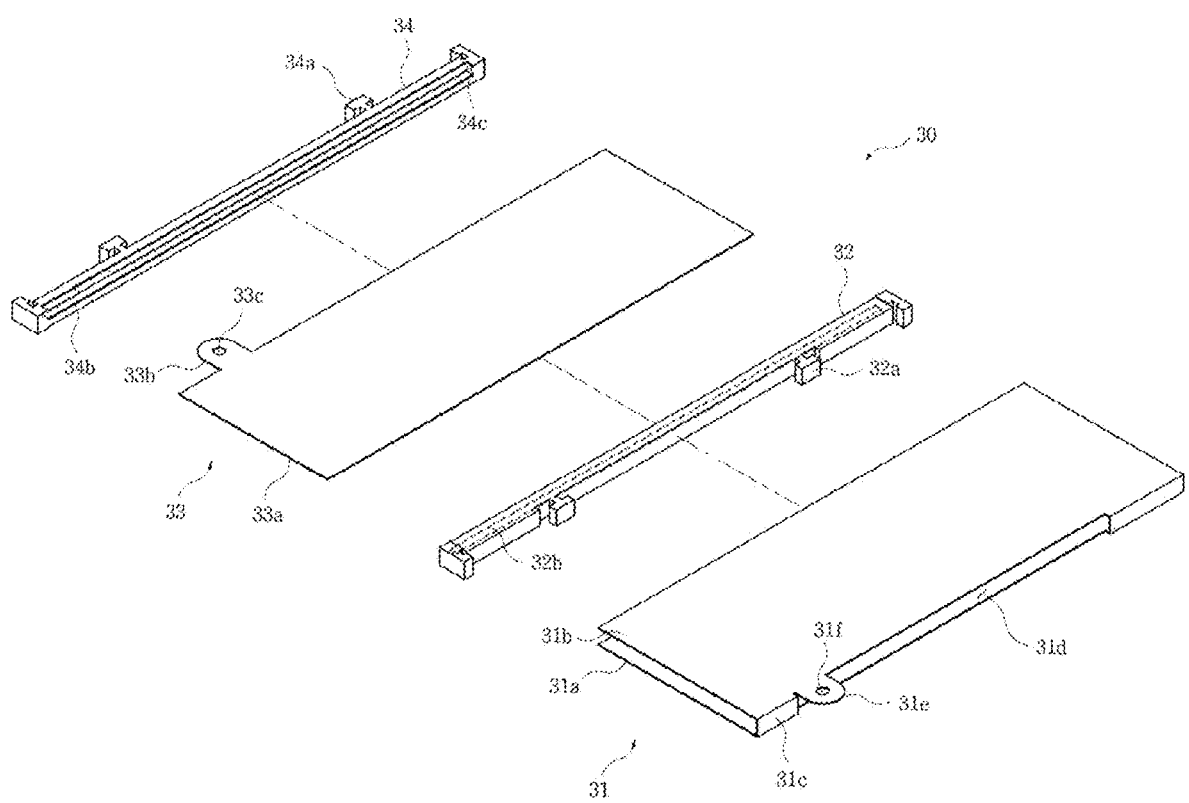
FIG. 5A is an exploded perspective view for describing the configuration of an electrode part of the fluid electrolysis apparatus illustrated in FIG. 1.
Figure 5B:
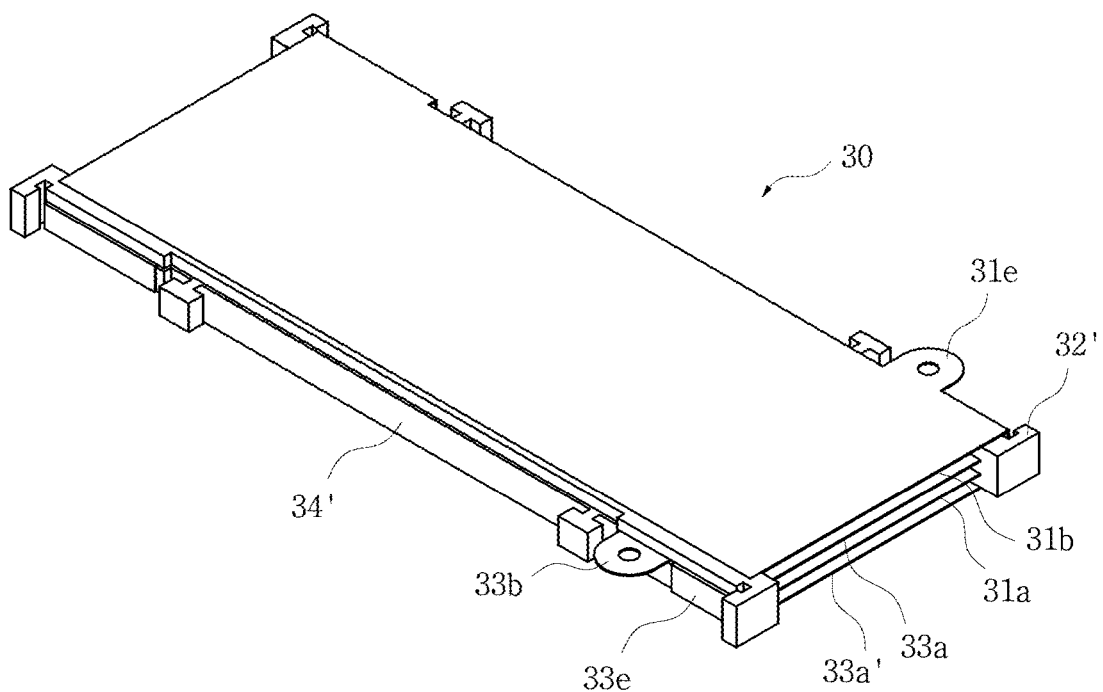
FIG. 5B illustrates a modified example of the electrode part.
Figure 6:
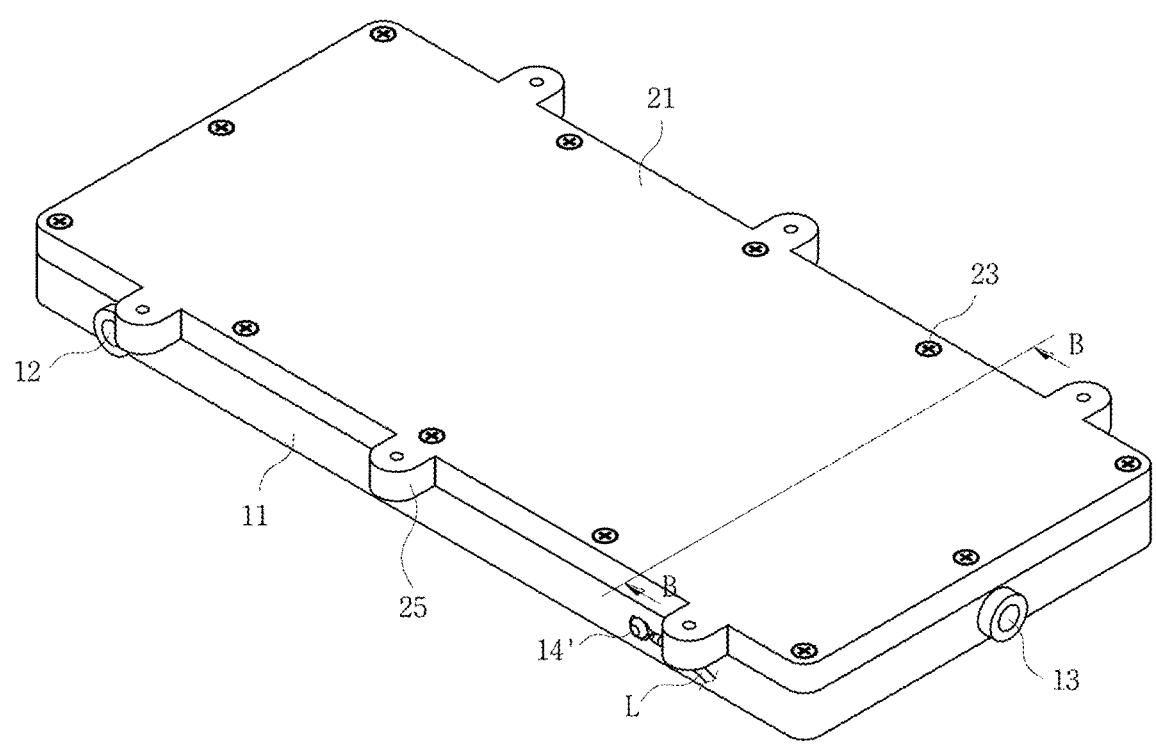
FIG. 6 is an assembled perspective view of the fluid electrolysis apparatus according to the present invention illustrated in FIG. 1.
Figure 7:
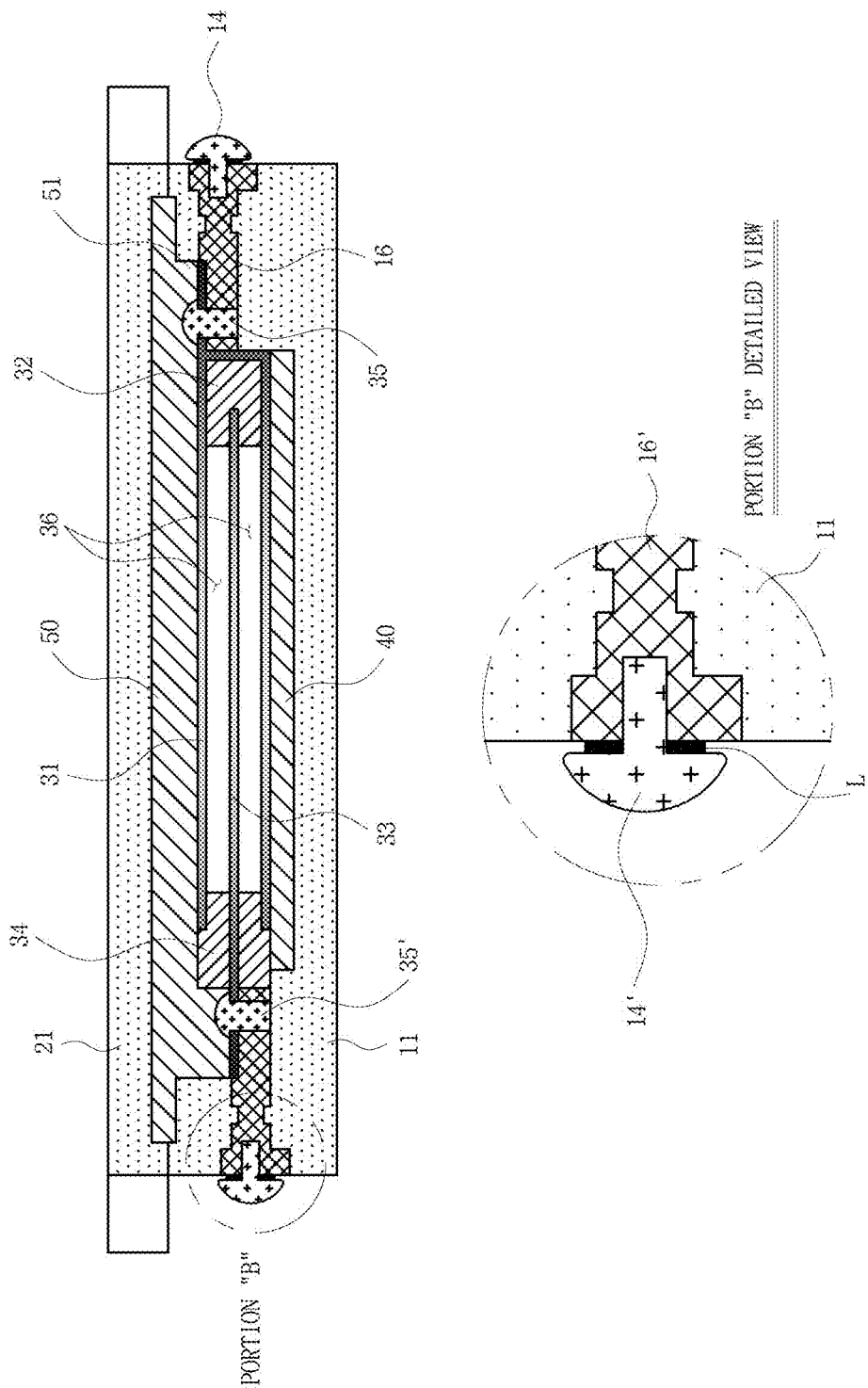
FIG. 7 is a cross-sectional view taken along line B-B in FIG. 6.

In addition, FIG. 5A is an exploded perspective view for describing the configuration of an electrode part of the fluid electrolysis apparatus illustrated in FIG. 1, FIG. 5B illustrates a modified example of the electrode part, FIG. 6 is an assembled perspective view of the fluid electrolysis apparatus according to the present invention illustrated in FIG. 1, and FIG. 7 is a cross-sectional view taken along line B-B in FIG. 6.

Figure 8:
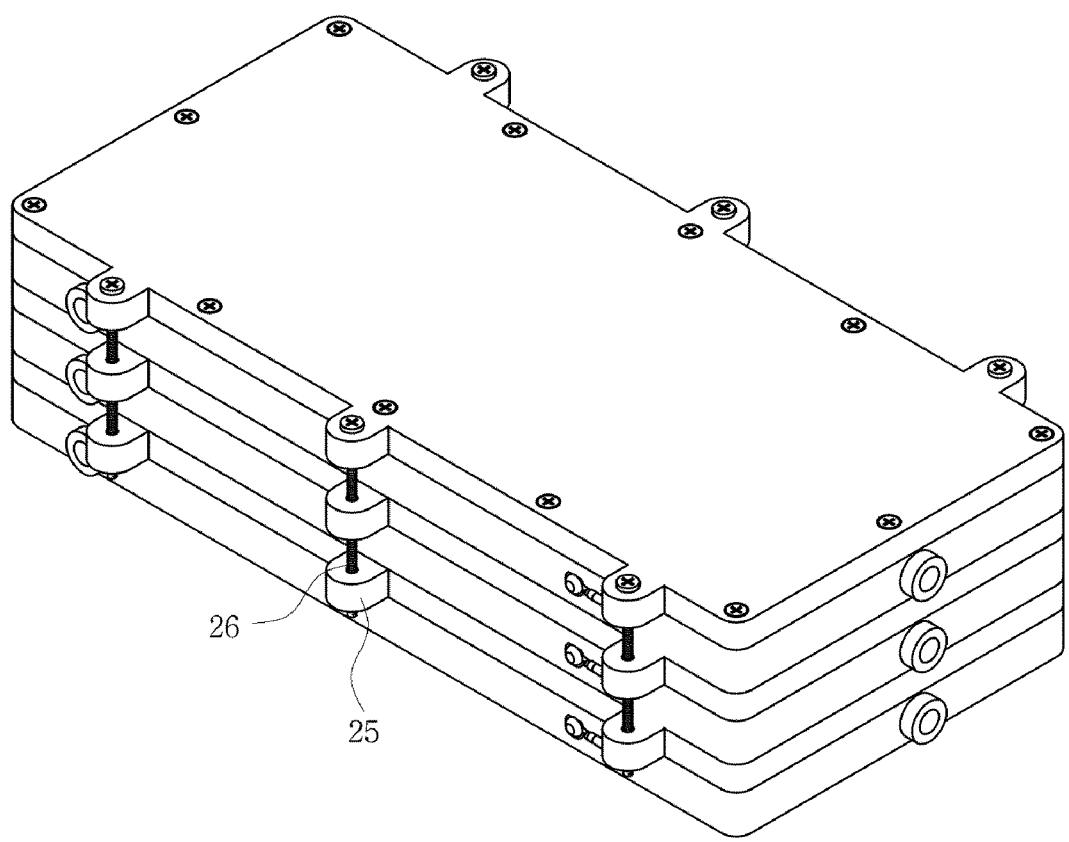
FIG. 8 is a view illustrating a form in which a plurality of fluid electrolysis apparatuses each illustrated in FIG. 1 are combined.

In addition, FIG. 8 is a view illustrating a form in which a plurality of fluid electrolysis apparatuses each illustrated in FIG. 1 are combined.

The fluid electrolysis apparatus according to one embodiment of the present includes a body part 11 and 21 provided with an inner space for electrolyzing an incoming fluid and discharging the electrolyzed fluid, an electrode part 30 mounted in the inner space, and gaskets 40 and 50 which are interposed between the electrode part 30 and inner surfaces of the body part 11 and 21 forming the inner space.

Further, the body part 11 and 21 includes a body 11 having a panel shape with an open upper surface cover 21 detachably coupled to the body 11 to open and close the upper surface of the body 11.

Further, the body 11 is coupled to the cover 21 through a plurality of first fastening members 23 as illustrated in FIG. 6. To this end, a plurality of first coupling holes 15 and a plurality of second coupling holes 22 are formed in an edge of the body 11 and an edge of the cover 21, respectively, at positions corresponding to each other.

Further, an inlet port 12 through which a fluid to be electrolyzed is introduced is formed at one side of the body 11, an outlet port 13 through which the introduced fluid is discharged is formed at the other de of the body 11, and inner spaces 12a, 13a, and 17 through which the fluid introduced through the inlet port 12 passes to be discharged through the outlet port 13 are formed inside the body 11

Here, upper surfaces of the inner spaces 12a, 13a, and 17 are open, and are opened and closed by the detachment and attachment of the cover 21.

In the present embodiment, as an example, the inlet port 12 and the outlet port 13 are formed on a lower right side surface and a central portion of an upper side surface of the body 11 on the basis of the drawings, respectively, but the present invention is not limited thereto, and the inlet port 12 and the outlet port 13 may be formed at different positions as necessary.

Further, as will be described below, the inner spaces 12a, 13a, and 17 include a first inner space 17 in which the electrode part 30 forming a plurality of channels 36 through which the fluid introduced through the inlet port 12 passes is mounted, a second inner space 12a disposed below the first inner space 17 and configured to form a supply channel connecting an inlet of the channel 36 formed by the electrode part 30 to the inlet port 12, and a third inner space 13a disposed above the first inner space 17 and configured to form a discharge channel connecting an outlet of the channel 36 formed by the electrode part 30 to the outlet port 13.

Further, a supply channel guide 12b for guiding the fluid introduced through the inlet 12 to the inlet of the channel 36 is formed in the second inner space 12a forming the supply channel between the inlet port 12 and the inlet of the channel 36 as described above, and a discharge channel guide 13b for guiding the fluid discharged from the channel 36 to the outlet port 13 is formed in the third inner space 13a forming the discharge channel between the outlet of the channel 36 and the outlet port 13.

Here, the supply channel guide 12b is formed in a shape that is closer to the inlet of the channel 36 as the inlet of the channel 36 is farther from the inlet port so that the fluid may be guided at a uniform rate over the entire inlet of the channel 36.

In the case of the present embodiment, the supply channel guide 12b is configured such that a portion of the supply channel guide 12b at a left side of the body 11 is closer to the inlet of the channel 36 than a portion the supply channel guide 12b at a right side of the body 11 in which the inlet port 12 is formed, and specifically, in the present embodiment, as an example, the supply channel guide 12b is configured to have a streamlined curved surface that is inclined upward from a right lower portion of the body, in which the inlet port 12 is formed, to a left upper portion of the body.

In the fluid electrolysis apparatus according to the present invention, since the fluid introduced through the inlet port 12 passes through the channel 36 at a uniform flow velocity according to the above-described configuration of the supply channel guide 12b, the fluid may be uniformly electrolyzed throughout the channel 36.

In addition, the discharge channel guide 13b may have a shape in which the width of the discharge channel is narrowed in a direction of the outlet poi 13 from the outlet of the chap 36 to increase the flow velocity of the fluid discharged through the outlet port 13.

Further, a first electrode support 17a and a second electrode support 17a', which are configured to fix and support the electrode part 30 at a position corresponding to a position at which the electrode part 30 is mounted, are formed to protrude from a bottom surface of the body 11 on both side surfaces of the first inner space 17, and a height at which each of the first and second electrode supports 17a and 17a' protrudes may be formed to correspond to a height of the electrode part 30.

In the present embodiment, the supply channel guide 12b and the discharge channel guide 13b described above also protrude from bottom surfaces of the inner spaces 12a, 13a, and 17 at the same height as the first and second electrode supports 17a and 17a' so that the inner spaces 12a, 13a, and 17 may be entirely sealed when a second gasket 50 to be described later is interposed therewith.

Further, a plurality of first electrode fixing slots 17b and a plurality of second electrode fixing slots 17b' are formed on the first and second electrode supports 17a and 17a', respectively, and as will be described below, electrode fixing protrusions formed on the electrode part 30 are coupled to the first and second electrode fixing slots 17b and 17b', respectively, so that the electrode part 30 is fixedly supported at both side surfaces of the first inner space 17 of the body 11.

Meanwhile, a pair of conductive connection terminals 16 and 16' to which external power sources L are connected using first and second power source fixing members 14 and 14', respectively, are coupled to both side surfaces of the body 11, and the conductive connection terminals 16 and 16' include a first connection terminal 16 connected to a first electrode 31 of the electrode part 30 to be described below and a second connection terminal 16' connected to a second electrode 33 of the electrode part 30.

Here, the configuration of each of the first and second connection terminals 16 and 16' is the same, and thus, hereinafter, in order to omit duplicate description, only the second connection terminal 16', which is relatively easy to describe with reference to the drawings, will be described.

The second connection terminal 16' is coupled to be embedded in the body 11 through a second connection terminal coupling hole 11a', and here, both end portions of the second connection terminal 16' are configured to be exposed toward an inside (i.e., in a direction of the first inner space) and an outside of the body 11 to connect one of a pair of terminals of the external power sources L having opposite polarities to the second electrode 33.

Here in the present embodiment, the second connection terminal 16' is illustrated in the drawing as being coupled to be embedded in the body 11 through the second connection terminal coupling hole 11a' only for convenience of description, but in the present invention, the second connection terminal 16' is integrally molded with the body 11 to prevent the fluid passing through the first inner space 17 from leaking through a power connection part.

To this end, in the present embodiment, as an example, the body 11 and the conductive connection terminals 16 and 16' are integrally molded by an insert-injection method.

Accordingly, the first and second connection terminal coupling holes 11a and 11a' in the drawing simply mean volumetric spaces of portions in which the first and second connection terminals 16 and 16' are embedded, respectively, when being integrally molded with the body 11, and thus, at the first and second connection terminal coupling holes 11a and 11a', airtightness between the body 11 and outer surfaces of the first and second connection terminals 16 and 16' is maintained by the integral molding.

Meanwhile, as will be described below, for the connection with the second electrode 33 of the electrode part 30, a second lead fixing part 16a' and a second lead fixing hole 16b' for fixing and electrically connecting a lead of the second electrode 33 are formed at one end portion of the second connection terminal 16', which is exposed toward the inside of the body 11, and in the present embodiment, as an example, the second lead fixing part 16a' is formed to have a flat surface exposed in a direction of the open upper surface of the body 11 (i.e., the open upper surface of the inner space) at the second electrode support 17a' and the second lead fixing hole 16b' is formed at a central portion of the second lead fixing part 16a'.

Further, as will be described below, a second power source fixing part 16c' and a second power source fixing hole 16d' for connecting one of the pair of terminals of the external power sources L are formed at the other end portion of the second connection terminal 16', which is exposed toward the outside of the body 11 for the connection with the external power source L, and in the present embodiment, as an example, the second power source fixing part 16c' is formed to have a flat surface exposed to an outer surface of one side of the body 11 (a right side surface of the body in the case of the present embodiment) and the second power source fixing hole 16d' is formed at a central portion of the second power source fixing part 16c'.

In addition, a second binding groove 16e' having an uneven shape may be further formed on an outer surface of the second connection terminal 16' to increase the binding strength with the body 11 before and after integral molding with the body 11 by insert-injection.

In addition, a pair of first and second support protrusions 12c and 13c are formed on the bottom surface of the first inner space 17 at an upper portion and a lower portion of the first inner space 17, respectively, and the first and second support protrusions 12c and 13c serve to partition a mounting position of a first gasket 40 interposed between the bottom surface of the first inner space 17 and an electrode plate of the electrode part 30 as will be described below.

Here, the first and second support protrusions 12c and 13c may each be formed in a wedge shape to minimize the flow resistance of the fluid passing through the inner spaces 12a, 13a, and 17 of the body 11, and specifically, the first support protrusion 12c may be inclined upward with respect to a direction in which the fluid passes and the second support protrusion 13c may be inclined downward with respect to the direction in which the fluid passes.

Finally, a second gasket seating groove 18 formed in an outward direction along edges of the upper surfaces of the inner spaces 12a, 13a, and 17 is formed on the open upper surface of the body 11 and as will be described below, an edge of the second gasket 50 interposed between the body 11 and the cover 21 is seated in the second gasket seating groove 18.

Next, the electrode part 30 includes the first electrode 31 and the second electrode 33 to which the external power sources L having opposite polarities (i.e., a positive pole and a negative pole of the power source) are applied, respectively, and a pair of support members 32 and 34 supporting the first electrode 31 and the second electrode 33 at both sides of the first inner space 17, respectively.

Here, an electrode plate of the first electrode 31 and an electrode plate of the second electrode 33 are alternately arranged to be spaced apart from each other in an upper surface direction of the first inner space 17 from the bottom surface of the first inner space 17 to form a plurality of channels 36 between the electrode plate of the first electrode 31 and the electrode plate of the second electrode 33 such that the fluid is electrolyzed while passing through the channels 36.

Here, the electrode plates of the first and second electrodes 31 and 33 may have the same thickness, length, and width so that the plurality of channels formed by the electrode plates not only have the same shape but also maintain the same voltage applied thereto in order for the fluid to be uniformly electrolyzed throughout the first inner space 17.

To this end, the first electrode 31 includes a plurality of first electrode plates 31a and 31b arranged to be spaced apart from each other such that the plate surfaces face each other, a connection plate 31c connecting one end portions of the first electrode plates 31a and 31b to each other, and a first lead 31e extending from the first electrode plates 31a and 31b or the connection plate 31c and connected to the first electrode plates 31a and 31b.

Further, the second electrode 33 includes at least one second electrode plate 33a alternately arranged with the first electrode plates 31a and 31b to be spaced apart from each other and having a plate surface facing those of the first electrode plates 31a and 31b, and a second lead 33b extending from the second electrode plate 33a.

Further, the support members 32 and 34 include a first support member 32 coupled to one end portion of the first electrode 31 at one side edge of the channel 36 to maintain a uniform separation distance between the first electrode plates 31a and 31b and the second electrode plate 33a that are alternately arranged, and a second support member 34 coupled to one end portion of the second electrode 33 at the other side edge of the channel 36 to maintain a uniform separation distance between the first electrode plates 31a and 31b and the second electrode plate 33a that are alternately arranged.

Here, the separation distance between the first and second electrode plates may be set to a distance at which a voltage may be uniformly applied to the entire channel, or a distance at which the electrolysis may be uniformly performed throughout the channel, in consideration of the area and thickness of the electrode plate, and in the present embodiment, as an example, a separation distance of 2 mm to 10 mm is maintained with respect to the electrode plate having a width of 25 mm to 50 mm, a length of 50 mm to 150 mm, and a thickness of 0.2 mm to 1 mm.

Further, the first electrode 31 and the second electrode 33 are fixedly supported on the inner surfaces of the body 11 facing both side edges of the channel 36 by the first support member 32 and the second support member 34, respectively, at one side of the inner space, and in the present embodiment, as an example, the first electrode 31 and the second electrode 33 are fixed to the first electrode support 17a and the second electrode support 17a', respectively.

To this end, in the present embodiment, as an example, the first electrode 31 configured such that one end portions of the pair of first electrode plates 31a and 31b facing each other are connected to each other through the connection plate 31c, and the first lead 31e is formed to extend in an outward direction from one end portion of the first electrode plate 31b.

Further, the first support member 32 is formed in a bar shape having a length in a longitudinal direction (that is, a longitudinal direction of the channel) of the first electrode plates 31a and 31b and is inserted between the first electrode plates 31a and 31b and coupled to one end portions of the first electrode plates in the longitudinal direction of the first electrode plates 31a and 31b while one side of an outer surface of the first support member 32 is brought into contact with the connection plate 31c.

Further, the first support member 32 includes a first electrode fixing protrusion 32a, which has a shape corresponding to the above-described first electrode fixing groove 17b, formed on an outer surface thereof being in contact with the connection plate 31c, and the first electrode fixing protrusion 32a protrudes to the outside through an opening 31d formed in the connection plate 31c and is coupled to the first electrode fixing groove 17b so that the first electrode 31 is fixedly supported in one side (the first electrode support in the case of the present embodiment) of the inner space.

Further, in the present embodiment, as an example, the second electrode 33 is configured as one second electrode plate 33a which is inserted between the first electrode plates 31a and 31b and forms two channels 36 together with the first electrode plates 31a and 31b, and the second lead 33b is formed to extend in an outward direction from one end portion of the second electrode plate 33a.

Further, the second support member 34 includes a second insertion groove 34b formed on an outer surface of one side thereof, and one end portion of the second electrode plate 33a is inserted into the second insertion groove 34b so that the second support member 34 is coupled to one side of the second electrode plate 33a in a longitudinal direction of the second electrode plate.

In this case, the second support member 34 includes a second electrode fixing protrusion 34a, which has a shape corresponding to the above-described second electrode fixing groove 17b', formed on a surface opposite to the surface on which the second insertion groove 34b is formed, and the second electrode fixing protrusion 34a is coupled to the second electrode fixing groove 17b' so that the second electrode 33 is fixedly supported at one side (the second electrode support in the case of the present embodiment) of the inner space.

Here, the second lead 33b is exposed to the outside through a through-hole formed in the middle of the second insertion groove 34b and in the present embodiment, the first lead 31e and the second lead 33b described above may be formed at position corresponding to a first lead fixing part 16a and the second lead fixing part 16a', respectively, exposed in an upper surface direction in the first inner space 17 as described above.

Further, as will be described below, the first lead 31e and the second lead 33b include a first through-hole 31f and a second through-hole 33c formed at central portions thereof, respectively, such that the first connection terminal 16 and the second connection terminal 16' may be electrically connected to the first lead 31e and the second lead 33b.

Further, the other end portions of the first electrode plates 31a and 31b, which are not coupled to the first support member 32, are coupled to the second support member 34, and the other end portion of the second electrode plate 33a, which is not coupled to the second support member 34, is coupled to the first support member 32, and thus the plurality of channels 36 form electrolysis reaction spaces that are independent of each other.

To this end, seating grooves 34c, to which the other end portions of the first electrode plates 31a and 31b are seated, are formed on a top surface and a bottom surface of the second support member 34, respectively, and a first insertion groove 32b, into which the other end portion of the second electrode plate 33a is inserted, is formed on a surface of the first support member 32, which is a surface opposite to the surface on which the first electrode fixing protrusion 32a is formed, that is, a surface facing the surface on which the second insertion groove of the second support member is formed.

Further, as described above, when the first support ember 32 and the second support member 34 fixedly support the first electrode 31 and the second electrode 33 at one sides (the electrode supports formed in a leftward direction and a rightward direction of the inner space, respectively, in the case of the present embodiment) of the inner surfaces of the body, respectively, coupling portions (i.e., one side edge and the other side edge of the channel) of the first and second support members 32 and 34 and the first and second electrode plates are in close contact with the inner surfaces (the first and second electrode supports 17a and 17a' in the case of the present embodiment) of the body 11, respectively, on which the first and second electrodes are fixedly supported, so that the electrode part 30 may prevent the fluid from passing between both side surfaces (i.e., between two side edges of the channel and the inner surfaces of the body, which face the two side edges of the channel) of the first inner space 17 and the electrode part 30.

The plurality of channels 36 formed by the above-described configuration of the electrode part 30 have not only substantially the same shape of the channel including the width of the channel, the thickness of the channel, and the length of the channel, but also substantially the same voltage applied to electrolyze the fluid because the electrode plate has the same thickness, length, width, and the like in each channel, and thus, the electrolysis is very uniformly performed throughout the first inner space 17.

Further, as described above, since both side end portions of the first and second electrode plates are all coupled to the first and second support members 32 and 34, all of the channels may be configured independently, and thus the electrolysis of the fluid may be more uniformly performed in each channel.

In the above, the case in which the first electrode 31 includes a pair of first electrode plates 31a and 31b facing each other and the second electrode 33 includes one second electrode plate 33a inserted between the first electrode plates 31a and 31b has been described as an example for convenience of description, but the present invention is not limited thereto, and it is to be appreciated that the number of electrode plates of the first electrode 31 and the second electrode 33 may be configured differently from the present embodiment within the range of maintaining the structure in which the first electrode plate and the second electrode plate are alternately arranged to be spaced apart from each other as described above.

However, in this case, when the second electrode 33 includes a plurality of second electrode plates 33a and 33a' as illustrated in FIG. 5B, the second electrode plates 33a and 33a' may be connected to each other through a connection plate 33e connecting one end portions of the second electrode plates 33a and 33a' similar to the first electrode 31 described above, and accordingly, the thickness and structure of the support members 32 and 34 may be configured differently from present embodiment.

The electrode part 30 configured as described above is mounted in the first inner space 17 such that the electrode plates, which are alternately arranged to be spaced apart from each other, are parallel to the bottom surface of the first inner space 17 by coupling the first and second electrode fixing protrusions 32a and 34a to the first and second electrode fixing slots 17b and 17b', respectively.

When the electrode part 30 is mounted in the first inner space as described above, the first lead 31e and the second lead 33b are seated on the first and second lead fixing parts 16a and 16a', respectively, and in this state, first and second lead fixing members 35 and 35' having a screw shape are coupled to the first and second lead fixing holes 16b and 16b' through the first and second through-holes 31f and 33c, respectively, so that the first electrode 31 and the second electrode 33 are electrically connected to the first and second connection terminals 16 and 16', respectively.

Further, the external power sources L include a pair of terminals (that is, a positive pole terminal and a negative pole terminal) each having a through hole formed in the central portion each thereof, and when the first and second power supply fixing members 14 and 14' having a screw shape are coupled to the first and second power source fixing holes 16d and 16d' through the through-holes of the pair of terminals of the external power sources L, respectively, and thus the external power sources L are electrically connected to the first and second connection terminals 16 and 16', power sources having opposite polarities are applied to the first and second electrodes 31 and 33, respectively, to perform the electrolysis of the fluid in the channels formed by the electrode plates.

Finally, the gaskets 40 and 50, which are interposed between the inner surfaces of the body part 11 and 21 facing the electrode plates of the electrode part 30 and the electrode part 30 in the inner space, include the first gasket 40 interposed between the bottom surface of the body 11 and the electrode plate (the first electrode plate 31a in the case of the present embodiment) arranged on the lowermost outer side of the electrode part 30, and the second gasket 50 interposed between the cover 21 and the electrode plate (the first electrode plate 31b in the case of the present embodiment) arranged on the uppermost outer side of the electrode part 30.

The first gasket 40 is formed in a panel shape having an area defined by the first and second support protrusions 12c and 13c and the first and second electrode supports 17a and 17a', mounted between the above-described first and second support protrusions 12c and 13c in the first inner space 17, and fixed in position in a lateral direction (i.e., a width direction of the channel) by the first and second electrode supports 17a and 17a' at the left and right sides of the first inner space 17 and fixed in position n a vertical direction longitudinal direction of the channel) by the first and second support protrusions 12c and 13c.

The first gasket 40 mounted as described above is interposed to be in close contact between the bottom surface of the body 11 and the electrode plate arranged on the lowermost outer side (the first electrode plate 31a in the case of the present embodiment) of the electrode part 30 to prevent the fluid from passing between the bottom surface of the body and the electrode part.

Further, the second gasket 50 is formed in a panel shape in which an edge portion is seated in the d gasket seating groove 18, and when the cover 21 is coupled to the body 11, the edge portion is interposed between a lower surface of the cover 21 and the second gasket seating groove 18 to perform a function of preventing the fluid passing through the inner spaces 12a, 13a, and 17 from leaking to the outside.

Here, a seating groove (not shown) having a shape corresponding to the shape of the second gasket may be formed on the lower surface of the cover 21 as necessary.

Further, as illustrated in FIG. 7, the second gasket 50 includes a protrusion 51 which has a shape corresponding to the open upper surfaces of the inner spaces 12a, 13a, and 17 and is formed at an inner side of the edge portion thereof seated in the second gasket seating groove 18. A height of the protrusion 51 may be formed to be equal to the height of a step between the second gasket seating groove 18 and the first and second electrode supports 17a and 17a' but may be formed to be slightly greater than the height of the step in consideration of the compression ratio when being coupled to the body part 11 and 21.

Here, although the protrusion 51 may have a smaller or greater protrusion height locally depending on the coupling state of components in the inner spaces 12a, 13a, and 17, the overall function is the same as described below, and thus hereinafter, a description of the local change of the shape of the protrusion 51 will be omitted.

In the second gasket 50 configured as described above, when the body 11 is coupled to the cover 21, the protrusion 51 is pressed against the first and second electrode supports 17a and 17a', the electrode part 30, the supply channel guide 12b, and the discharge channel guide 13b having the same height as described above to firstly seal the inner spaces 12a, 13a, and 17 and to secondly seal the inner spaces 12a, 13a, and 17 by the edge portion closely interposed between the second gasket seating groove 18 and the lower surface of the cover 21, thereby preventing the fluid passing through the inner spaces 12a, 13a, and 17 from leaking to the outside.

Further, the second gasket 50 prevents the fluid from passing between the cover 21 and the electrode part 30 because the protrusion 51 is interposed to be in close contact with the electrode plate (the first electrode plate 31b in the case of the present embodiment) arranged on the uppermost outer side of the electrode part 30.

Further, the first and second gaskets 40 and 50 prevent reaction heat, which is generated in the electrode plate of the electrode part 30 in the electrolysis process, from being directly transmitted to the body part 11 and 21 and thus also perform a function of preventing the body part 11 and 21 from being thermally deformed due to the reaction heat to prevent the fluid passing through the inside of the body part 11 and 21 from leaking to the outside.

Accordingly, the first and second gaskets 40 and 50 may be made of a heat resistant material and may be made of a material having further chemical resistance to prevent the function of the gasket from being deteriorated due to corrosion caused by chemical substances depending on the type of fluid.

Meanwhile, the fluid electrolysis apparatus according to the present invention may be configured such that a plurality of electrolysis apparatuses are combined to easily increase or decrease electrolysis capacity according to the needs of a user. To this end, the fluid electrolysis apparatus according to the present invention is provided with a coupling component, which may be used to combine the plurality of electrolysis apparatuses, on one side of the body part 11 and 21.

To this end, in the present embodiment, as an example, a plurality of coupling protrusions 25 for stacking are each formed at an e portion of the cover 21 as illustrated in FIG. 8, and a coupling hole 25*a* for stacking is formed in each of the coupling protrusions 25 for stacking.

Accordingly, in the fluid electrolysis apparatus fluid according to the embodiment of the present invention, a plurality of electrolysis apparatuses may be stacked and used as necessary using a fastening member 26 for stacking that may include a conventional fastening member such as a bolt and a nut.

As described above, the fluid electrolysis apparatus according to the present invention may improve the electrolysis efficiency of a fluid and also reduce the overall size and manufacturing costs of the apparatus by alternately arranging the electrode plates of the first electrode and the second electrode constituting the electrolysis electrode in the body part to be spaced apart from each other at uniform intervals to form a plurality of channels through which a fluid passes to have the same shape so that the fluid is entirely and uniformly electrolyzed.

Further, the fluid electrolysis apparatus according to the present invention may further improve the electrolysis efficiency of a fluid by interposing the heat-resistant gasket between the outermost electrode plate and the inner surface of the body part to prevent the fluid from passing through a path other than the channel and also to prevent the fluid flowing inside the body part from leaking due to the thermal deformation of the body by the reaction heat of the electrode plate.

Further, the fluid electrolysis apparatus according to the present invention may further improve the electrolysis efficiency of a fluid by configuring the first electrode and the second electrode to be electrically connected to the external power sources through the conductive connection terminals formed integrally with the body part to prevent the fluid flowing inside the body part from leaking through the power connection part.

INDUSTRIAL APPLICABILITY

A fluid electrolysis apparatus according to the present invention may perform a function as a non-diaphragm electrolytic cell and thus may be used as an apparatus for generating slightly acidic hypochlorous acid water and the like for industrial or home use.

The invention claimed is:

1. A fluid electrolysis apparatus comprising:
    a body having an inlet port and an outlet port disposed therein and provided with an inner space through which a fluid introduced through the inlet port passes to be discharged through the outlet port;
    an electrode mounted in the inner space and including a first electrode plate and a second electrode plate to which external power sources of opposite polarities are applied, respectively;
    a conductive connection terminal configured to provide a path through which the external power sources are applied to the electrode, and coupled to the body; and
    a heat-resistant gasket interposed between an inner surface of the body and the electrode and extended across an entire length of the electrode and an entire width of the electrode to prevent the fluid from passing between the inner surface of the body and the first electrode plate disposed at an outermost side of the electrode,
    wherein the first electrode plate and the second electrode plate are alternately arranged to be spaced apart from each other,
    a channel, in which the fluid is electrolyzed while passing therethrough, is disposed between the first electrode plate and the second electrode plate,
    the heat resistant gasket includes a first gasket having a panel shape and interposed to be in contact between a bottom surface of the body and the first electrode plate disposed at a lower outermost side of the electrode and a second gasket having a panel shape and interposed to be in contact between a lower surface of a cover and the first electrode plate disposed at an uppermost outer side of the electrode,
    a protrusion having a shape corresponding to an open upper surface of the inner space is disposed in the second gasket,
    the conductive connection terminal includes a first connection terminal and a second connection terminal, and
    the conductive connection terminal is integrally molded with the body by insert injection such that the outer surface is embedded in the body so that airtightness between the body and outer surfaces of the first and second connection terminals is maintained, and the conductive connection terminal has one end portion exposed toward an inside of the body so as to be connected to the electrode and another end portion exposed toward an outside of the body so as to be connected to the external power-sources.

2. The fluid electrolysis apparatus of claim 1, wherein the electrode includes a first electrode including the first electrode plate and a first lead connected to the first electrode plate, and a second electrode including the second electrode plate and a second lead connected to the second electrode plate,
    the first electrode plate is provided as a plurality of first electrode plates disposed to be spaced apart from each other such that plate surfaces face each other,
    the second electrode plate are alternately disposed with the plurality of first electrode plates to be spaced apart from each other and have plate surfaces facing those of the first electrode plates, and
    the first connection terminal is electrically connected to the first lead and the second connection terminal is electrically connected to the second lead.

3. The fluid electrolysis apparatus of claim 2, wherein the first connection terminal includes a first lead fixing part and a first power source fixing part,
    the second connection terminal includes a second lead fixing part and a second power source fixing part, in the electrode, the first lead and the second lead are coupled to the first lead fixing part and the second lead fixing part, respectively, through lead fixing members in the inner space, and a pair of terminals of the external power sources having opposite polarities are coupled to the first power source fixing part and the second power source fixing part, respectively, through power source fixing members at an outer side of the body so that the external power sources are applied to the first electrode and the second electrode.

4. The fluid electrolysis apparatus of claim 3, wherein the electrode further includes a first support member coupled to one end portion of the first electrode plate in a longitudinal direction of the first electrode plate at one side edge of the channel to maintain a separation distance between the first electrode plate and the second electrode plate that are alternately arranged and a second support member coupled to one end portion of the second electrode plate in a longitudinal direction of the second electrode plate at another side edge of the channel to maintain a separation distance between the first electrode plate and the second electrode plate that are alternately arranged, and the first electrode and the second electrode are supported on inner surfaces of the body facing both side edges of the channel by the first support member and the second support member, respectively, in the inner space.

5. The fluid electrolysis apparatus of claim 4, wherein another end portion of the first electrode plate is coupled to the second support member, and another end portion of the second electrode plate is coupled to the first support member so that the channel comprises a plurality of channels formed independently of each other.

6. The fluid electrolysis apparatus of claim 4, wherein when the first electrode and the second electrode are supported on the inner surfaces of the body by the first support member and the second support member, respectively, in the electrode, a coupling portion of the first electrode plate and the first support member and a coupling portion of the second electrode plate and the second support member are in contact with the inner surfaces of the body part, respectively, on which the first electrode and the second electrode are supported.

7. The fluid electrolysis apparatus of claim 1, wherein
a supply channel guide configured to guide the fluid introduced through the inlet port to an inlet of the channel at a uniform flow velocity is formed between the inlet of the channel and the inlet port in the inner space, and the supply channel guide is formed in a shape that is closer to the inlet of the channel as the inlet of the channel is farther from the inlet port.

* * * * *